March 8, 1966 R. E. CARTER 3,239,322
PROCESS FOR SEALING VACUUM-TIGHT SPINEL BODIES
Filed May 24, 1961
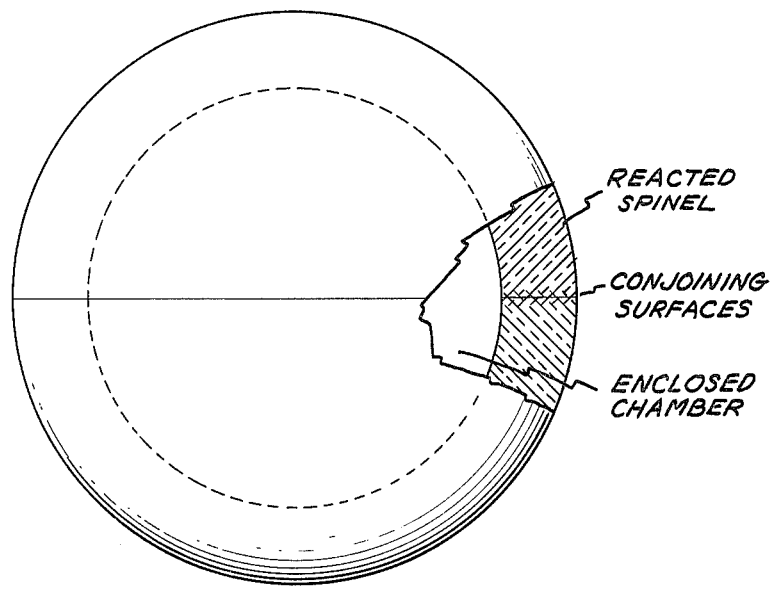
Inventor:
Ralph E. Carter,
by Richard A. Beer
His Attorney.

United States Patent Office 3,239,322
Patented Mar. 8, 1966

3,239,322
PROCESS FOR SEALING VACUUM-TIGHT SPINEL BODIES
Ralph E. Carter, Colonie, N.Y., assignor to General Electric Company, a corporation of New York
Filed May 24, 1961, Ser. No. 112,181
7 Claims. (Cl. 65—30)

This invention relates to ceramic processes and more particularly to an improved process for forming spinel bodies, for example, magnesium aluminate and magnesium ferrite bodies defining a chamber isolated from the surrounding atmosphere in which individual sub-bodies of $Al_2O_3$ or $Fe_2O_3$ are reacted with divalent metal oxides such as magnesia to convert the material to spinel and effect vacuum-tight sealing of the individual sub-bodies into an integral final body.

The sealing of ceramic parts to form vacuum-tight intricate shapes has long been a problem in the electronics industry. Articles such as vacuum tubes, lamp envelopes, and the like, for example, must have seals capable of retaining high vacuums, even when subjected to severe thermal cycling. Most present seals are effected by metal closures joined to the ceramic parts by procedures such as brazing, etc., and are limited in their ability to withstand cycling over large temperature ranges. This inability is due at least in part to the different coefficients of expansion between the ceramic and metal parts. Even when the coefficients of expansion have been approximately matched over limited temperature ranges, the problems encountered in adequately bonding chemically dissimilar materials have been major.

It is a principal object of this invention to provide a process for forming vacuum-tight sealed ceramic bodies.

An additional object of this invention is to provide a process for producing vacuum-tight sealed bodies of magnesium aluminate or magnesium ferrite.

Other objects and advantages of this invention will be in part obvious and in part explained by reference to the accompanying specification and drawing.

The figure of the drawings illustrates one type of vacuum type body produced by fusing together the conjoining surfaces of hemispherical sections of a divalent metal oxide through reaction with either alumina or ferric oxide.

The process of this invention is generally one wherein suitably formed sub-bodies which may be formed either of $Al_2O_3$ or $Fe_2O_3$ are provided with mating surfaces enabling assembly of the individual parts into a final desired shape. The mating surfaces are placed in conjoint relationship and the assembly then heated to an elevated temperature in the presence of a suitable divalent metal oxide such as magnesia, zinc oxide and nickel oxide. The reaction taking place between the oxide and the $Al_2O_3$ or $Fe_2O_3$ results in the transformation of the starting material into a spinel, specifically where MgO is the divalent metal oxide; $MgAl_2O_4$ or $MgFe_2O_4$. Simultaneous with the transformation of the starting aluminum or iron-oxide into spinel, the junctures at the mating surfaces of the sub-bodies are cemented by the formation and growth of spinel so that vacuum-tight seals between the individual parts of the final body are formed.

Considering the application of the invention to some specific geometries, completely sealed vacuum-tight bodies having an inner chamber isolated from the surrounding atmosphere can be obtained by suitably shaping a quantity of either $Al_2O_3$ or $Fe_2O_3$ into preselected configuration. Methods for producing these shapes include slip casting, powder compacting, extrusion, etc. For example, a final body having a generally spherical shape can be produced by forming two hemispherical bodies, each of which will have a mating surface where the hemispheres are to be joined. By then adequately positioning the mating surfaces in conjoint or abutting relationship and reacting the assembly with the selected divalent metal oxide, the entire structure is converted to spinel and the juncture between the two hemispheres made integral. An elongated, sealed, tubular shape can be produced by taking tubing which can be advantageously produced by extrusion techniques, and then applying end caps of composition identical to the tubing to the ends of the tube and reacting this assembly with divalent metal oxide. It is obvious that other and more intricate shapes can be produced by this technique.

Considering a specific application of the invention, magnesia-alumina spinel bodies are formed by preparing suitably shaped sub-bodies, as mentioned previously, and reacting with magnesia. The alumina can be used with no material added to it or additions of magnesia up to 0.5 weight percent can be added to the starting material if desired. Starting compositions which include additions of magnesia can be processed according to the procedures described in Coble application, Serial No. 80,965, filed January 3, 1961, to obtain starting bodies of high density and substantial transparency. Spinel bodies ultimately produced from these compositions have extremely high densities and high transparency and are thus extremely well suited for applications such as lamp envelopes where transmission of light and resistance to heat are critical factors to be considered.

The alumina can then be reacted with magnesia either by surrounding the bodies with solid magnesia and firing at an elevated temperature or by subjecting the alumina to the presence of magnesia vapor carried in a hydrogen atmosphere or in an atmosphere containing some hydrogen. If vapor phase transport of the magnesia is used, it is not necessary that the magnesia be in contact with the alumina bodies but only that an atmosphere carrying magnesia vapor be directed into intimate contact with the assembly. This is quite readily effected by placing both the alumina and a quantity of magnesia or magnesia-bearing compound in a chamber and directing a stream of hydrogen over the source of magnesia and into contact with the alumina sub-bodies.

Temperatures ranging from about 1500° C. to 1900° C. have been found adequate in reacting magnesia with alumina, the reaction taking place at a low rate at the lower end of the temperature range and at higher rates as the reaction temperature is increased toward 1900° C. Temperatures beyond 1900° C. are generally not suitable due to the formation of a liquid phase which results in undesirable mechanical properties in the final spinel body.

The time of reaction is a function of the temperature at which the reaction is being effected as well as the thickness of the body to be formed. It is apparent that relatively thin or small bodies of spinel can be formed in much less time than bodies of comparatively greater thickness. Similarly since the rate of reaction is temperature dependent, the use of higher temperatures can result in lesser periods of reaction time.

An additional factor which bears on the time at which the bodies must be held at the elevated temperature is that of insuring that cracks do not appear when the bodies are cooled down to room temperatures. Generally, firing times on the order of at least three times the period necessary to react all of the alumina with magnesia is necessary to insure a crack-free final body. This time was found to be necessary due to spinel composition gradients existing across the thickness of the spinel bodies. Specifically, the surface subjected initially to the magnesia forms the stoichiometric spinel $MgAl_2O_4$ more quickly than the inner surface, or surface which is farthest removed from the magnesia. The inner surface is aluminarich so that the coefficient of expansion varies greatly from that of the outer surfaces of the spinel body. By continuing the firing for periods of not less than about three times that necessary to convert the alumina to spinel, the composition gradients are removed and uniform coefficient of expansion throughout the body is obtained.

Whereas the reaction between magnesia and alumina can be a vapor transport mechanism, the $MgO$-$Fe_2O_3$ reaction is felt to be essentially a solid state reaction, so that production of the spinel $MgAl_2O_4$ will normally be effected by contacting the $Fe_2O_3$ sub-bodies with solid magnesia. Firing of the MgO and $Fe_2O_3$ sub-bodies at temperatures of about 1100° C. to 1500° C. will result in the transformation of the $Fe_2O_3$ into the spinel composition $MgFe_2O_4$. In this instance, the atmosphere to which the materials are subjected during firing must be one substantially inert with regard to the $Fe_2O_3$. That is the atmosphere must not be one which will reduce the $Fe_2O_3$. It has been found that oxygen is well suited for carrying out the spinelization process within the temperature range indicated. It will be recognized, however, that the use of other atmospheres will permit the use of firing temperatures slightly different from the 1100 to 1500° C. temperatures used when an oxygen atmosphere is present.

Considering a specific example of an $MgAl_2O_4$ body produced by the present process, an alumina ring having generally flat end walls was assembled with flat alumina disks closing the open ends thereof. These disks, of course, had surfaces which mated with the end walls of the alumina ring. This assembly of sub-bodies was reacted at 1900° C. in hydrogen with magnesia for a time sufficient to convert all of the alumina to spinel. Although the initial alumina body was somewhat porous, an outer layer of highly dense spinel was formed which rendered the body, including the lines of juncture, vacuum-tight.

The transformation of alumina into spinel, as was done with the ring previously described, is felt to occur by reason of counter-current diffusion of $Mg^{+2}$ and $Al^{+3}$ ions through the relatively rigid oxygen framework of the spinel. To maintain charge balance for every three mols of $Mg^{+2}$ ions which diffuse to the spinel-alumina interface, two mols of $Al^{+3}$ ions diffuse to the surface of the spinel. Additional spinel is thus created at the outer and inner spinel surfaces in the ratio of one part to three. Since spinel formed on the inner spinel surface uses the oxygen framework of the alumina with only a relatively minor rearrangement of the ions, any flaws, pores or cracks in the alumina are present in the spinel. The spinel formed at the outer surface, however, is created by the reaction between the $Al^{+3}$ ions which have diffused to the surface and the magnesium oxide and oxygen in the atmosphere. Thus, a relatively perfect oxygen framework is built up which contains no pores and will seal over all cracks and joints. Of course, if starting alumina sub-bodies of high density, that is, substantially free of cracks, pores, or other flaws, are used, then the final body will have much greater density.

A sealed body composed of $MgO$-$Fe_2O_3$ spinel was produced by assembling appropriately formed sub-bodies by reacting starting bodies of $Fe_2O_3$ with magnesia at 1370° C. for 39 hours in oxygen. The assembly was sectioned, polished and examined microscopically to determine that the spinel $MgFe_2O_4$ had been formed. Thus, use of these materials also permits the obtaining of vacuum-tight bodies suitable for use in apparatus of the type described.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. The method of forming vacuum tight sealed bodies of a spinel of a divalent metal oxide reacted with an oxide selected from the group consisting of $Al_2O_3$ and $Fe_2O_3$ comprising, assembling mating surfaces of suitably shaped sub-bodies composed of a starting material selected from the group consisting of $Al_2O_3$ and $Fe_2O_3$ in conjoint relationship defining a chamber isolated from the surrounding atmosphere, placing the assembled sub-bodies in contact relationship with respect to the selected divalent metal oxide, and heating the assembled sub-bodies and divalent metal oxide to a temperature causing reaction therebetween, the reaction converting the starting material to spinel and simultaneously cementing the juncture between the sub-bodies into a vacuum tight seal.

2. The method of forming vacuum tight sealed bodies of a divalent metal oxide-alumina spinel comprising, assembling mating surfaces of suitably shaped sub-bodies composed of alumina in conjoint relationship defining a chamber isolated from the surrounding atmosphere, placing the assembled sub-bodies in contact relationship with respect to the selected divalent metal oxide, and heating the assembled sub-bodies and divalent metal oxide to a temperature causing reaction therebetween, the reaction converting the starting material to spinel and simultaneously cementing the juncture between the sub-bodies into a vacuum tight seal.

3. The method of forming vacuum tight sealed bodies of a magnesia-alumina spinel comprising, assembling mating surfaces of suitably shaped sub-bodies composed of alumina in conjoint relationship defining a chamber isolated from the surrounding atmosphere, placing the assembled sub-bodies in contact relationship with the magnesia, and heating the assembled sub-bodies and magnesia to a temperature of from about 1500 to 1900° C. in an atmosphere containing hydrogen for a time sufficient to convert the alumina to alumina-magnesia spinel and simultaneously cement the juncture between the sub-bodies into a vacuum-tight seal.

4. The process as defined in claim 3 wherein said sub-bodies are maintained at temperature for times not less than three times as long as the period required to convert all of the alumina to spinel.

5. The method of forming vacuum tight sealed bodies of a magnesia-alumina spinel comprising, assembling mating surfaces of suitably shaped sub-bodies composed of alumina in conjoint relationship defining a chamber isolated from the surrounding atmosphere, placing the assembled sub-bodies in contact with vaporized magnesia in a hydrogen atmosphere at temperatures of from about 1500 to 1900° C. for times sufficient to convert the alumina to magnesia-alumina spinel and simultaneously cement the juncture between the sub-bodies into a vacuum-tight seal.

6. The method of forming vacuum tight sealed bodies of magnesium ferrite comprising, assembling mating surfaces of suitably shaped sub-bodies composed of $Fe_2O_3$ in conjoint relationship defining a chamber isolated from the surrounding atmosphere, and placing the assembled sub-bodies in contact with magnesia at temperatures of from about 1100° C. to 1500° C. for times sufficient to convert the $Fe_2O_3$ to $MgFe_2O_4$ and simultaneously cement the juncture between the sub-bodies into a vacuum-tight seal, said reaction being effected in an atmosphere essentially non-reactive with respect to the $Fe_2O_3$.

7. The process as defined in claim 6 wherein said atmosphere is oxygen.

(References on following page)

References Cited by the Examiner

UNITED STATES PATENTS

| | | | |
|---|---|---|---|
| 2,212,556 | 8/1940 | Baier | 65—32 X |
| 2,515,706 | 7/1950 | Greiner et al. | 65—43 |
| 2,618,579 | 11/1952 | Brajer | 156—89 |
| 2,620,598 | 12/1952 | Jobling-Purser et al. | 65—43 |
| 2,889,952 | 6/1959 | Claypoole | 65—33 X |
| 2,945,327 | 7/1960 | Malm et al. | 65—43 X |
| 3,013,362 | 12/1961 | Calkins et al. | 65—32 |
| 3,023,492 | 2/1962 | Briston | 65—43 X |
| 3,025,204 | 3/1962 | Heintz | 65—43 X |
| 3,083,123 | 3/1963 | Navias | 106—42 X |

FOREIGN PATENTS 501,930   4/1954   Canada.

OTHER REFERENCES

"Hanbook of Glass Manufacture," vol. II, by Fay V. Tooley, pub. by Ogden Publ. Co., 55 W. 42nd St., New York 36, N.Y., pp. 187 to 199.

"Phase Diagrams for Ceramists" by Levin, McMurdie and Hall, pub. by The American Ceramic Society, Columbus, Ohio, 1956, pages 14 to 34.

DONALL H. SYLVESTER, *Primary Examiner.*

F. W. MIGA, *Assistant Examiner.*